Aug. 28, 1923.
C. J. CAMPBELL ET AL
1,466,270
ANTISKID DEVICE
Filed Jan. 6, 1923
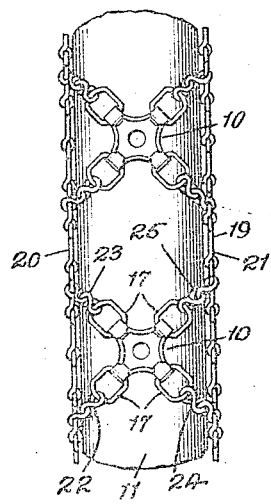
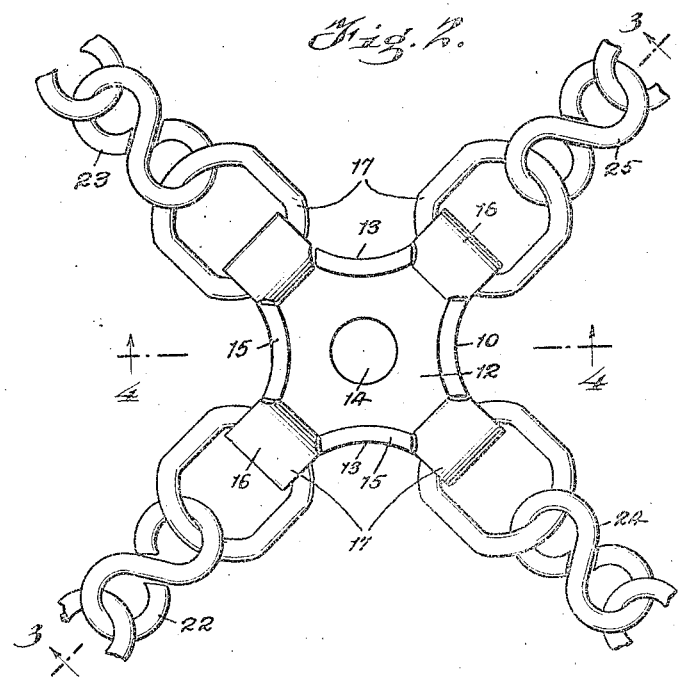
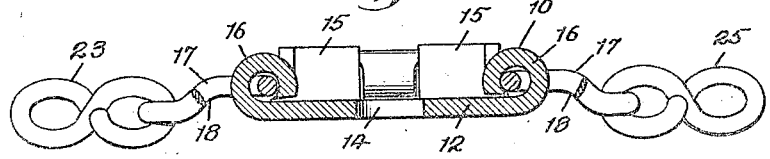
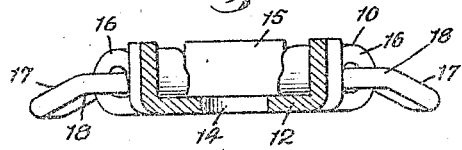
INVENTORS
Colin J. Campbell & Daniel O'Neill
BY
N. T. Criswell
ATTORNEY Patented Aug. 28, 1923.

1,466,270

UNITED STATES PATENT OFFICE.

COLIN J. CAMPBELL, OF EAST ORANGE, NEW JERSEY, AND DANIEL O'NEILL, OF NEW YORK, N. Y.

ANTISKID DEVICE.

Application filed January 6, 1923. Serial No. 611,023.

*To all whom it may concern:*

Be it known that we, COLIN J. CAMPBELL and DANIEL O'NEILL, both citizens of the United States, and residents of East Orange, in the county of Essex and State of New Jersey, and of New York, in the county of New York and State of New York, respectively, have invented certain new and useful Improvements in an Antiskid Device, of which the following is a full, clear, and exact specification.

This invention relates to a class of devices adapted to be used for preventing skidding of vehicles when travelling.

Our invention has for its object primarily to provide a device designed to be employed for overcoming the liability of vehicles, such as automobiles, autotrucks and the like, from skidding when travelling on slippery highways, and which is of a form especially adapted for use on elastic tires in a manner whereby the surface will be engaged for preventing the tires from tendency to skid in sidewise directions as well as being of a form serving to avoid the danger of cutting or prematurely wearing the tire. The invention consists essentially of a series of tread elements which are in relative spaced annular arrangement for being removably applied on the tread portion of an elastic tire, and these elements are connected together by an annular chain element. Each of the tread elements is provided with spaced arcuate ground grippers in relative substantially rectangular arrangement, and each gripper is preferably approximately square in cross section whereby the free lengthwise edges with the ends of one or more of the grippers will engage the surface when the tire with the vehicle tends to slide sidewise.

A further object of the invention is to provide an anti-skid device of a simple, efficient and durable construction adapted to be made in any appropriate size and shape.

With these and other objects in view, the invention will be hereinafter more fully explained with reference to the accompanying drawing forming a part of this specification in which similar characters of reference indicate corresponding parts in all the views, and will then be pointed out in the claims at the end of the description.

In the drawing, Figure 1 is a fragmentary view showing a front elevation of part of an elastic tire with parts of our improved anti-skid device applied thereto.

Fig. 2 is an enlarged fragmentary view showing a plan of one of the tread elements of the device with portions of the connecting chains thereof.

Fig. 3 is a detail sectional view taken on the line 3—3 of Fig. 2, and

Fig. 4 is a detail sectional view taken on the line 4—4 of Fig. 2.

The device has a series of corresponding tread elements 10 which are disposed in spaced circumferential relation for being removably arranged on the tread portion of an elastic tire, as 11, of the wheel of a vehicle.

The tread elements 10 may be of appropriate sizes and shapes though each element is preferably composed of a body part or flat plate 12 of substantially a rectangular shape of a size so that the plates of all of the elements will extend slightly sidewise beyond the tread portion of the tire when the device is applied thereon. The central parts of all of the edges of the plate 12 of each element is concaved, as at 13, and in the central part of each plate may be an opening 14 for serving to discharge snow or mud when collected between the tire and the plates of the tread elements.

Protruding from the outer face of the plate 12 of each of the tread elements at the edge of the concavities 13 of each plate are corresponding arcuate ground grippers, as 15. The ground grippers of each plate are in the forms of flanges of preferably substantially rectangular shapes in cross sections, and these flanges of each plate may be of lengths and curvatures conforming to the curvatures and lengths of the concavities of the plate.

The ends of the ground grippers or flanges 15 of each tread element are therefore spaced apart, and extending from the corners of the plate of each element may be apertured lugs or eyes, as 16, disposed in relative crosswise arrangement. The holes through these lugs extend crosswise through the free end portions of the lugs, and in the apertures of the lugs of the body, part or plate 12 of each tread element are movably held one of the ends of links or rings, as 17. These links may be of somewhat elongated shapes, and the central part of each link of each tread element may be curved, as at 18, so that the links will lie closely upon the curved parts of the tire alongside of its tread portion.

The tread elements thus formed are connected together by a chain element, as 19, for removably applying the tread elements to the tire. The chain element 19 may be of any appropriate type, though we prefer to provide a form of the chain element having two spaced annular parts as 20, 21, each of which is composed of chained links. The member 20 of the chain element is connected to the links 17 at the corners of one side edge of each of the plates 12 of the tread elements 10 by two short chains, as 22, 23, and the member 21 of the chain element is connected to the other two links 17 at the corners of the second side edge of the plates of the tread elements by two short chains, as 24, 25. When the device is applied to a tire the annular parts 20, 21 are disposed upon the sides of the tire with the tread elements 10 being disposed on the tread portion of the tire. The chain members 22, 23, and 24, 25 will then be disposed crosswise relatively of the tire radially with respect to the tread elements, as shown, so that the lengthwise edges with the ends of one or more of the ground grippers or flanges of one or more of the tread elements will engage the surface of the highway for preventing the vehicle when travelling from skidding in sidewise directions. Moreover, by disposing the short chains 22, 23 and 24, 25 in radial directions the tread elements 10 will be held on the tire against tendency to accidentally shift on the tread portion of the tire when under the strain of the tire tending to skid.

In the foregoing description, we have embodied the preferred form of our invention, but we do not wish to be understood as limiting ourselves thereto, as we are aware that modifications may be made therein without departing from the principle or sacrificing any of the advantages of this invention, therefore, we reserve to ourselves the right to make such changes as fairly fall within the scope thereof.

Having thus described our invention, we claim as new and desire to secure by Letters Patent:—

1. A tread element for an anti-skid device, comprising a substantially rectangular flat plate with the central parts of its edges being concaved and having protruding from one of its faces at its concaved edges flanges, each angular in cross section, and apertured lugs extending from the corners of the plate.

2. A tread element for an anti-skid device, comprising a substantially rectangular flat plate with an opening in its center and having the central parts of its edges concaved, curved corresponding flanges, each substantially rectangular in cross section, protruding from one of the faces of the plate at its concaved edges, apertured lugs disposed in relative crosswise arrangement extending from the corners of the plate and links movably mounted in the apertures of the lugs of the plate.

This specification signed and witnessed this 5th day of January, A. D. 1923.

COLIN J. CAMPBELL.
DANIEL O'NEILL.

Witnesses:
R. FELDMAN,
J. FREDERICK CRYER.